United States Patent [19]

Unser

[11] Patent Number: 4,953,325
[45] Date of Patent: Sep. 4, 1990

[54] THREAD GRINDING ATTACHMENT

[75] Inventor: Edwin W. Unser, Williston Park, N.Y.

[73] Assignee: Grumman Aerospace Corporation, Bethpage, N.Y.

[21] Appl. No.: 366,956

[22] Filed: Jun. 16, 1989

[51] Int. Cl.⁵ .............................................. B24B 3/00
[52] U.S. Cl. .................................. 51/95 TG; 51/165.8
[58] Field of Search ............ 51/95 TG, 165.8, 165.81, 51/288; 409/65, 67, 72, 75, 79

[56] References Cited

U.S. PATENT DOCUMENTS

| | | | |
|---|---|---|---|
| 2,303,008 | 11/1942 | Turrettini | 51/95 TG |
| 2,367,957 | 1/1945 | Metcalfe | 51/95 TG |
| 3,337,996 | 8/1967 | Stade et al. | 51/95 TG |
| 3,538,647 | 11/1970 | Woloszyn | 51/95 TG |

Primary Examiner—J. J. Hartman
Assistant Examiner—M. Rachuba
Attorney, Agent, or Firm—Pollock, VandeSande & Priddy

[57] ABSTRACT

A conventional cutting tool grinder is fitted with an attachment which imparts translational motion to the cutting tool grinder table in accordance with the pitch of a removable master threaded member. A crank drives a pulley linked to the master threaded member and rotates a translating work piece in accordance with the thread on the master treaded member. Accordingly, a grinding tool can duplicate the thread of a work piece as dictated by the master threaded member. The mechanism of this invention can also be embodied as a separate bench mounted machine incorporating a grinding tool such that it does not require attachment to a conventional cutting tool grinder for its operation.

7 Claims, 1 Drawing Sheet

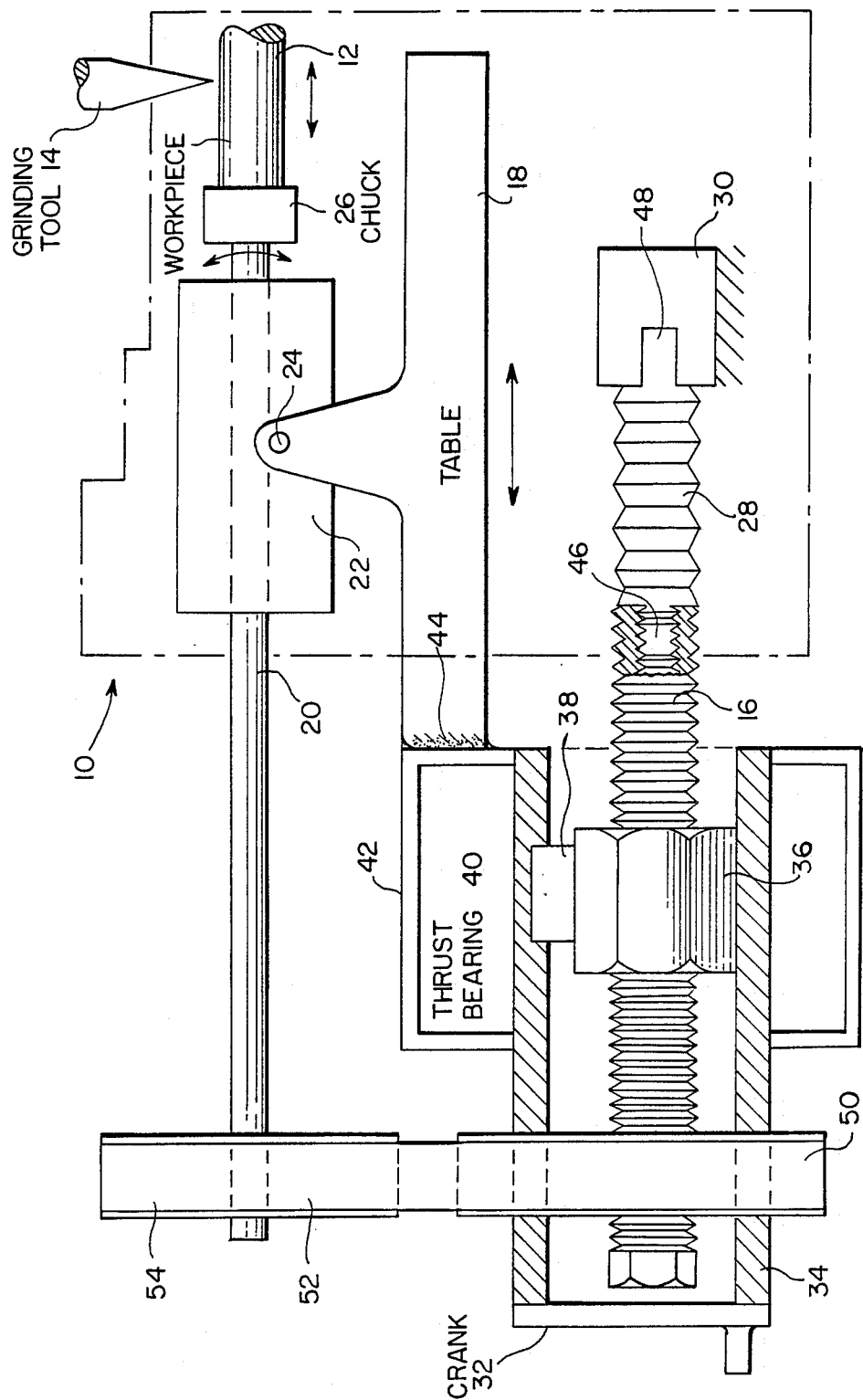

THREAD GRINDING ATTACHMENT

FIELD OF THE INVENTION

The present invention relates to thread-grinding devices, and more particularly to apparatus which can be used as an attachment to a cutting tool grinder which permits duplication of a master thread.

BACKGROUND OF THE INVENTION

In the production of threaded members, a tool grinder is usually employed with a fixed pitch. This type of machine serves little use in a machine shop where different threads must be quickly formed in fasteners for different applications. Complex machines are available for forming threaded members of different pitch but they are quite costly. A need exists for an attachment to a machine which is frequently used in machine shops at the present time so that different types of threaded members may be quickly made with a minimum investment in capital equipment.

BRIEF DESCRIPTION OF THE INVENTION

The present invention is an attachment for a conventional and popular cutting tool grinder such as the MONOSET machine manufactured by the Cincinnati Machine Corporation. A removable master thread is quickly inserted in place and a rotational/translational coupling connects the master thread with the machine table. The table connects a work piece in contact with a grinding tool and the work piece is rotated and translated relative to the grinding tool to duplicate the thread of the master threaded member.

BRIEF DESCRIPTION OF THE FIGURE

The above-mentioned objects and advantages of the present invention will be more clearly understood when considered in conjunction with the accompanying drawing, in which:

the figure is a schematic illustration of the present attachment, as employed in conjunction with a conventional cutting tool grinder.

DETAILED DESCRIPTION OF THE INVENTION

The present invention is an attachment to be employed with a conventional cutting tool grinder, such as schematically illustrated in the dotted box labeled 10. A typical cutting tool grinder of this type is widely known as the MONOSET machine, manufactured by the Cincinnati Machine Corporation. The structure external of the machine 10 is the attachment which constitutes the present invention and the purpose of the present invention is to form a thread on work piece 12 which is maintained in contact with a grinding wheel or tool 14. The thread formed in the work piece will be a duplication of that present in the removable master threaded member 16. The following is a description as to how the machine illustrated in the figure duplicates the thread pattern of the threaded member 16 on the work piece 12.

The machine 10 includes a movable table 18 and a manually rotated drive shaft 20. The drive shaft passes through a journal 22 which is pivotally mounted at 24 to the table 18. The pivot allows minor adjustment of the journal 22 to insure parallel positioning of threaded member 16 and drive shaft 20 which slides through the journal. The outward end of the drive shaft terminates in a chuck 26 which secures the work piece 12. A machine such as 10 generally includes a threaded guide 28 which is fixed within a socket 30. Conventionally, table 18 translates in accordance with the pitch of the threaded guide 28; but with the attachment of the present invention, a coaxially secured master threaded member 16 will govern the translational motion of table 18.

Crank 32 moves the table. The crank is connected to the left end of sleeve 34 and the threaded member 16 is coaxially and concentrically positioned within the sleeve 34. The nut 36 is keyed to the sleeve 34, as indicated at 38. As crank 32 is turned, the sleeve 34 rotates thereby imparting rotation to nut 36 which follows the thread of master threaded member 16. The sleeve 34 mounts a thrust bearing 40 and an end bell 42 encloses the thrust bearing 40. The table 18 is connected at 44 to the end bell so that turning of crank 32 imparts translational motion to table 18 in accordance with the thread of the master threaded member 16. In order to secure the master threaded member 16 in place, a female threaded end is internally formed for receiving a matching threaded end 46 of threaded guide 28. Since the guide 28 is keyed at 48 to a fixed socket 30, the master threaded member 16 will not turn.

With nut 36 undergoing translational motion which is imparted to the work piece 12 via table 18, it is still necessary to impart rotational motion of work piece 12 to complete the formation of a thread thereon in duplication of the thread on member 16. In order to accomplish this, a pulley wheel 50 is secured to sleeve 34 and rotates therewith. A belt 52 entrains a second pulley wheel 54, the latter being secured to the left outward end of drive shaft 20. Pulley wheels 50 and 54 translate together. Thus, as crank 32 is rotated, the pulley just described imparts rotational motion to the connected chuck 26 and thus retained work piece 12 at the same time that the table imparts translational motion to the work piece 12. Accordingly, as the crank 32 is manually turned, the grinding wheel or tool 14 duplicates the thread of the master threaded member 16 on the work piece 12 in a simple and efficient manner. The apparatus shown maintains a fixed one-to-one thread ratio between the master threaded member 16 and the work piece 12. When a new work piece having a different thread is to be machined, the master threaded member 16 is simply unscrewed from the threaded guide 28; and a new master threaded member is inserted for a repeat of the operation just described. It will be appreciated that the mechanism of the invention, in conjunction with a grinding tool, can also be embodied as a separate bench-mounted machine not requiring attachment to a conventional cutting tool grinder for its operation.

It should be understood that the invention is not limited to the exact details of construction shown and described herein for obvious modifications will occur to persons skilled in the art.

I claim:

1. An attachment for a cutting tool grinder machine which includes a translatable table and a shaft-driven chuck for securing a cylindrical work piece in contact with a grinding tool, the attachment comprising:
   a fixed removable master thread member;
   a sleeve coaxially mounted over the master thread member;
   a nut mounted to the master thread member and keyed to the sleeve;

a crank connected to the sleeve for rotating the sleeve and the keyed nut;

means connected between the sleeve and the table for causing the translation of the latter upon turning of the crank at a rate corresponding to the pitch of the master thread member; and means connected between the sleeve and a drive shaft of the machine for rotating the work piece while it translates to duplicate the thread of the master threaded member.

2. The structure set forth in claim 1 wherein the means for causing the table translation comprises a thrust bearing for translating sleeve rotation to longitudinal translation thereof; and means seated on the bearing and connected to the table for directly moving the table with the longitudinal translation.

3. The structure set forth in claim 1 wherein the work piece rotating means comprises:

pulley means entraining the drive shaft and the sleeve for imparting rotation from the sleeve to the drive shaft.

4. The structure set forth in claim 1 wherein the machine includes a threaded guide being fixed at one end and threadingly connected to a confronting end of the master thread member which extends coaxially therewith.

5. The structure set forth in claim 3 wherein the pulley means comprises two pulley wheels having a ratio affecting to the pitch of the thread finally formed in the work piece.

6. An attachment for a cutting tool grinder machine which includes a translatable table and a shaft-driven chuck for securing a cylindrical work piece in contact with a grinding tool, the attachment comprising:

a fixed removable master thread member;

a sleeve coaxially mounted over the master thread member;

a nut mounted to the master thread member and keyed to the sleeve;

a crank connected to the sleeve for rotating the sleeve and the keyed nut;

a thrust bearing contacting the sleeve for translating sleeve rotation to longitudinal translation;

means seated on the bearing and connected to the table for directly moving the table with the longitudinal translation upon turning of the crank at a rate corresponding to the pitch of the master thread member;

pulley means entraining the drive shaft and sleeve for imparting rotation from the sleeve to a drive shaft thereby rotating the work piece while the latter translates which duplicates the thread of the master threaded member.

7. The structure set forth in claim 6 wherein the machine includes a threaded guide being fixed at one end and threadingly connected to a confronting end of the master thread member which extends coaxially therewith.

* * * * *